July 7, 1970 F. G. EGUIZABAL 3,518,972
FASTENING DEVICES FOR TYING CATTLE
Filed Sept. 3, 1968 11 Sheets-Sheet 1
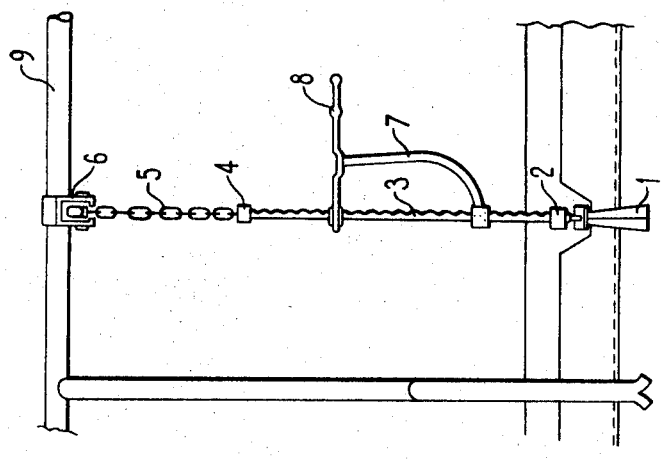
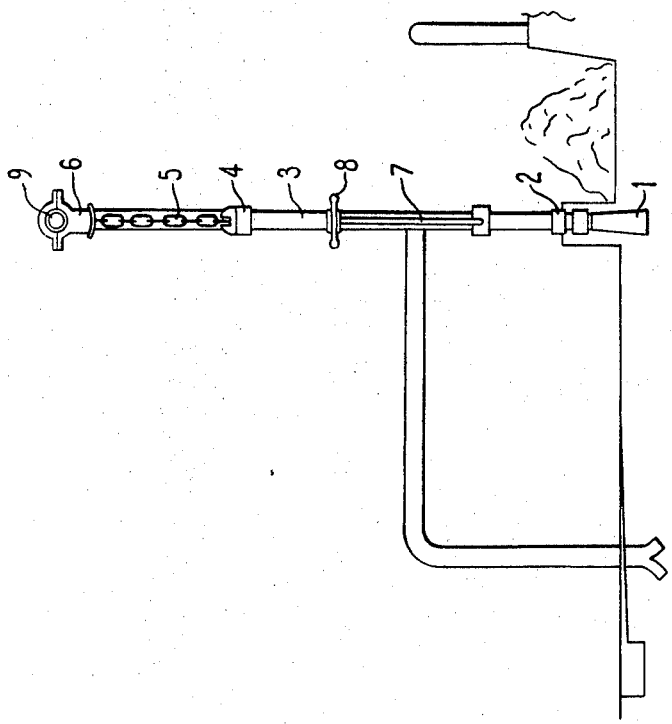
Inventor
FERNANDO GARCIA EGUIZABAL July 7, 1970 F. G. EGUIZABAL 3,518,972
FASTENING DEVICES FOR TYING CATTLE
Filed Sept. 3, 1968 11 Sheets-Sheet 2
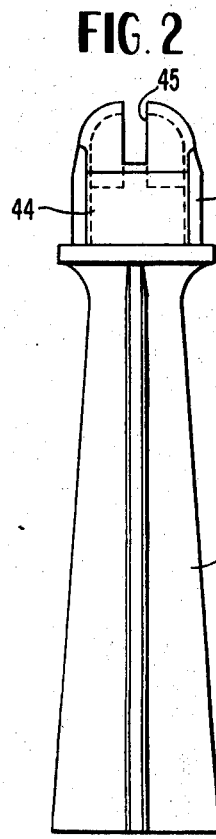
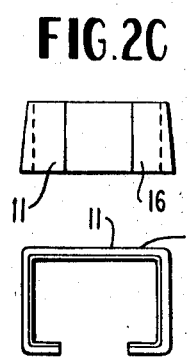
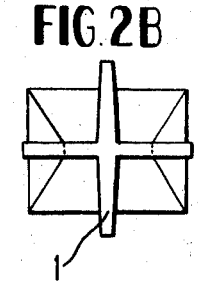
Inventor
FERNANDO GARCIA EGUIZABAL
By Smirie & Smiley
Attorneys July 7, 1970  F. G. EGUIZABAL  3,518,972
FASTENING DEVICES FOR TYING CATTLE
Filed Sept. 3, 1968  11 Sheets-Sheet 3

Inventor
FERNANDO GARCIA EGUIZABAL

By Amirie & Smiley
Attorneys

July 7, 1970   F. G. EGUIZABAL   3,518,972
FASTENING DEVICES FOR TYING CATTLE
Filed Sept. 3, 1968   11 Sheets-Sheet 4
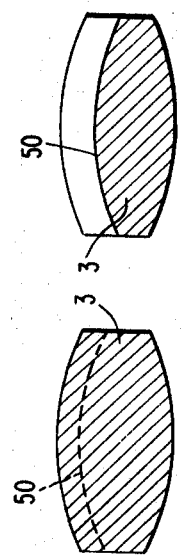
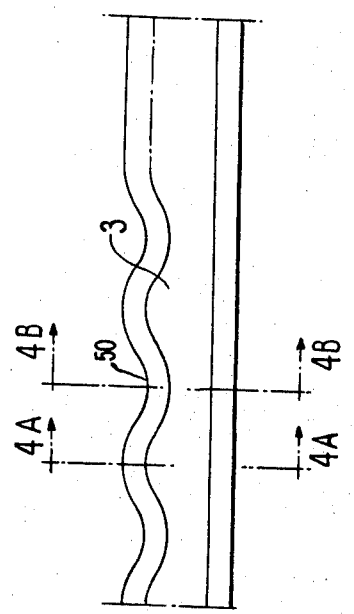
*Inventor*
FERNANDO GARCIA EGUIZABAL
By
*Attorneys*

July 7, 1970  F. G. EGUIZABAL  3,518,972
FASTENING DEVICES FOR TYING CATTLE
Filed Sept. 3, 1968  11 Sheets-Sheet 5
FIG. 5
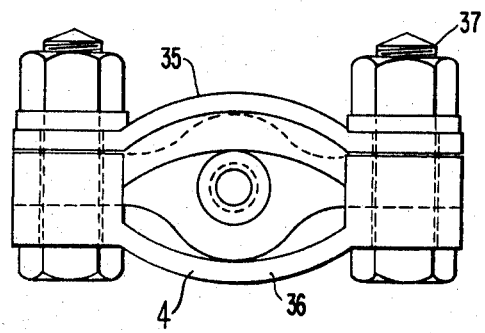
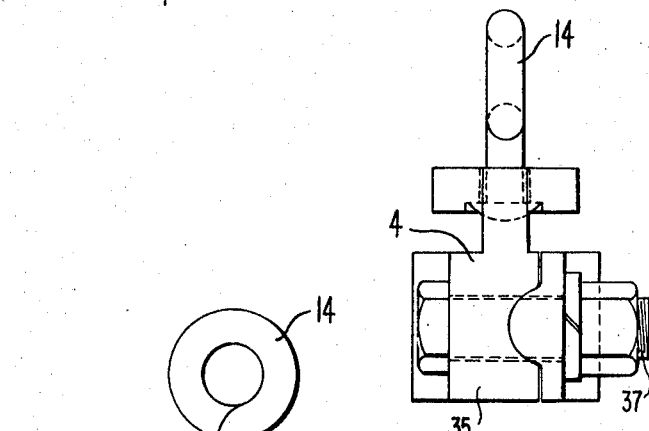
FIG. 5A
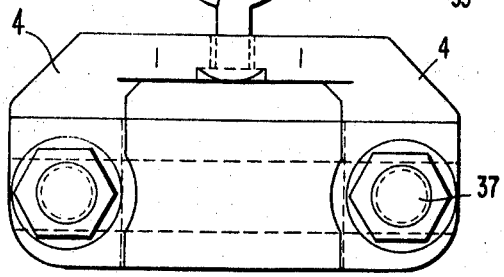
FIG. 5B
*Inventor*
FERNANDO GARCIA EGUIZABAL
By *Imirie & Smiley*
*Attorneys*

July 7, 1970      F. G. EGUIZABAL      3,518,972
FASTENING DEVICES FOR TYING CATTLE
Filed Sept. 3, 1968      11 Sheets-Sheet 6
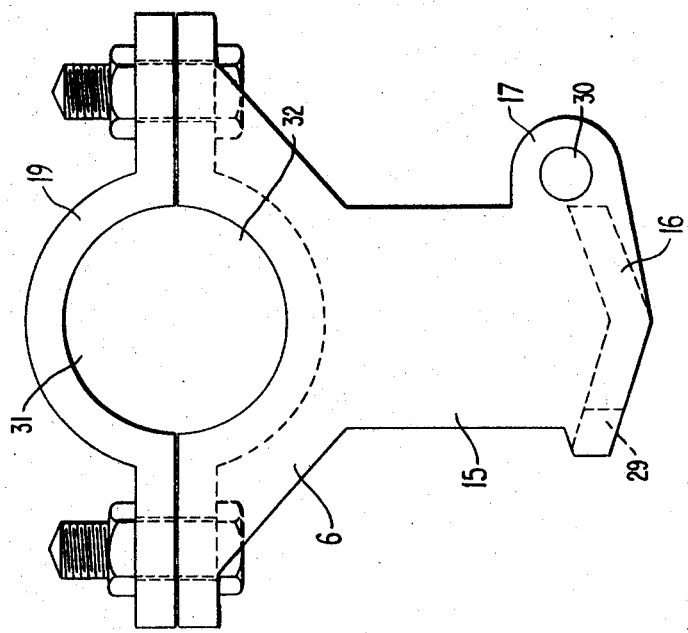
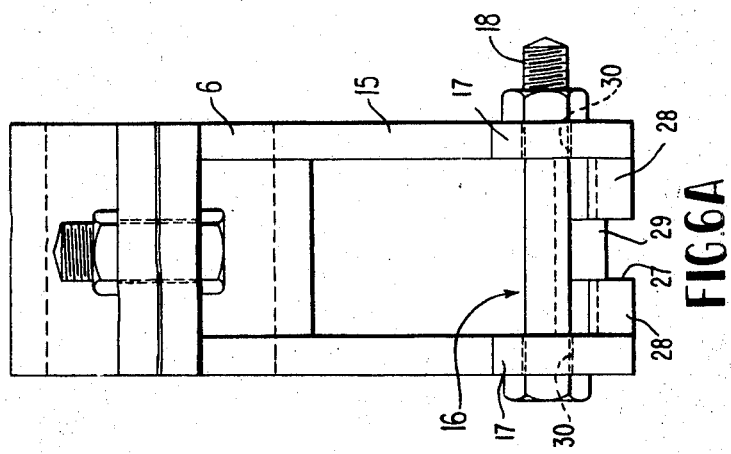
*Inventor*
FERNANDO GARCIA EGUIZABAL
By *Imirie & Smiley*
*Attorneys*

July 7, 1970 F. G. EGUIZABAL 3,518,972
FASTENING DEVICES FOR TYING CATTLE
Filed Sept. 3, 1968 11 Sheets-Sheet 7

Inventor
FERNANDO GARCIA EGUIZABAL

By
Attorneys

July 7, 1970     F. G. EGUIZABAL     3,518,972
FASTENING DEVICES FOR TYING CATTLE Filed Sept. 3, 1968     11 Sheets-Sheet 8

*Inventor*
FERNANDO GARCIA EGUIZABAL

By *Imirie & Smiley*
*Attorneys*

July 7, 1970 F. G. EGUIZABAL 3,518,972
FASTENING DEVICES FOR TYING CATTLE
Filed Sept. 3, 1968 11 Sheets-Sheet 9

Inventor
FERNANDO GARCIA EGUIZABAL

By Imirie & Smiley
Attorneys

Inventor
FERNANDO GARCIA EGUIZABAL

United States Patent Office 3,518,972
Patented July 7, 1970

3,518,972
FASTENING DEVICES FOR TYING CATTLE
Fernando Garcia Eguizabal, Cobreces, Santander, Spain
Filed Sept. 3, 1968, Ser. No. 756,949
Claims priority, application Spain, Sept. 2, 1967, 344,719
Int. Cl. A01k 1/06
U.S. Cl. 119—119            7 Claims

ABSTRACT OF THE DISCLOSURE

A fastening device for livestock, such as cattle, includes a vertically disposed tie member anchored between an overhead beam and the floor, and a collar element slidably mounted on said tie member and adapted to be disposed about the neck of an animal. The tie member is of a non-uniform cross-section and configuration so that the collar element will bind thereon when released from the animal and will not fall to the ground.

BACKGROUND OF THE INVENTION

This invention relates to a fastening device, and more particularly, a fastening device for tying cattle in their stalls in a stable. Devices used for tying cattle in stables essentially consist of a vertical tie fastened at its lower end to the stable floor and at its upper end to a structural element of the stable, such as a beam. A rigid arm, articulated to the vertical tie acts as a collar which is adapted to be secured about the animal's neck. The arm should normally slide with lifting and lowering motions on the vertical tie to permit raising and lowering of the animal's head. One of the disadvantages of such a device is that on releasing the animal, the arm slides on the vertical tie and falls to the ground. This necessitates raising the arm and collar again to replace it on the beast's neck.

SUMMARY OF THE INVENTION

According to the invention, a fastening device for cattle comprises a vertical tie member supported from an overhead beam and anchored at its opposite end to the floor or ground. In one form, the tie member is elastic in nature and is provided with undulations along one surface. A collar element, adapted to be disposed about the neck of the animal, is articulated to the vertical tie member and includes a ring portion encircling the tie. The ring portion has an interior projection complementally shaped to the undulations on the tie member. When upright, the ring and collar can slide on the tie. When an animal is released, however, the collar swings away from the tie and the projection on the ring will frictionally bind in an undulation on the tie to retain the collar at a selected position ready for use when the animal is returned to its stall. In another form, the tie is a chain. The ring portion of the collar, when upright, is of a dimension which will allow free passage of the chain, but when canted, will seat on a link or frictionally bind thereon, thereby preventing fall of the collar to the ground.

The vertical tie consists of a band of relatively elastic nature, preferably nylon, which has a general oval-shaped cross-section. Furthermore, on one of its wide flat surfaces, the one that faces the collar and the beast's neck, undulations are provided. The ovality of this band is not absolutely necessary but it is convenient, particularly on the inside surface of the tie, which is the surface making rubbing contact with the animal's skin. It makes this contact softer, thus avoiding damage to the beast's neck.

The undulations provided on the same side, are, on the contrary, essential since this particular shape of the band on one of its surfaces is just what prevents the collar from sliding unduly along the tie and falling to the ground. The collar is fitted to the band by an integral ring having a complemental undulation or projection. The internal diameter of the ring is provided with the necessary clearance to make vertical sliding movement of the collar possible and the animal can raise and lower its head, but the ring will cant upon release of the collar from engagement with the animal, causing the projections on the ring to frictionally bind on the undulations of the band. This frictional lock immobolizes the collar and its end at the height it was when the animal was released, thereby allowing it to be placed again around the animal's neck, without moving it.

The elastic nature of the band used as a vertical tie allows a slight tensioning, preventing the motion or sudden pulling of the animal from damaging the animal.

In another form of the invention, the band can be replaced by a chain. The ring integrally connected to the collar and encircling the chain in this form will also frictionally bind on the chain as the collar is pivoted upon release of the animal.

BRIEF DESCRIPTION OF THE DRAWINGS

FIG. 1 is a front view in elevation of my improved fastening device;

FIG. 1A is a side view in elevation of the fastening device illustrated in FIG. 1, as seen from the left-hand side of FIG. 1;

FIG. 2 is a front view in elevation of a ground anchor for the fastening device;

FIG. 2A is a side view in elevation of the ground anchor illustrated in FIG. 2, as seen from the right-hand side of FIG. 2;

FIG. 2B is a bottom plan view of the ground anchor illustrated in FIG. 2;

FIG. 2C is a side view in elevation of a clamp used with the ground anchor illustrated in FIG. 2;

FIG. 2D is a top plan view of the clamp illustrated in FIG. 2C;

FIG. 4 is a fragmentary side view in elevation of the elastic band of the fastening device;

FIG. 4A is a cross-sectional view taken substantially along the plane indicated by line 4A—4A of FIG. 4;

FIG. 4B is a cross-sectional view taken substantially along the plane indicated by line 4B—4B of FIG. 4;

FIG. 5 is a bottom plan view of an upper clamping jaw for holding the band of the fastening device;

FIG. 5A is a side view in elevation of the upper clamping jaw, as seen from the left-hand side of FIG. 5;

FIG. 5B is a front view in elevation of the upper clamping jaw, as seen from the top of FIG. 5;

FIG. 6 is a front view in elevation of an upper support of the fastening device;

FIG. 6A is a side view in elevation of the upper support illustrated in FIG. 6, as seen from the right-hand side of FIG. 6;

FIG. 10A is a top plan view of the clip portion of the collar illustrated in FIG. 10;

DESCRIPTION OF THE PREFERRED EMBODIMENTS

Figure 3B:
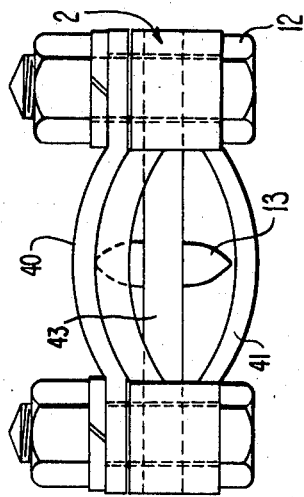
FIG. 3B is a bottom plan view of the lower jaw shown in FIG. 3A.
Figure 3A:
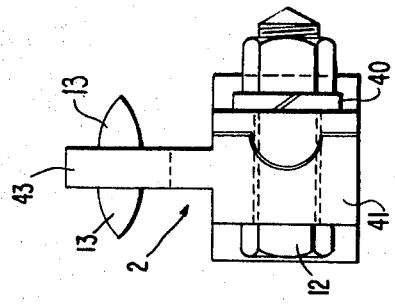
FIG. 3A is a front view in elevation of the lower jaw of FIG. 3, as seen from the left-hand side of FIG. 3.
Figure 3:
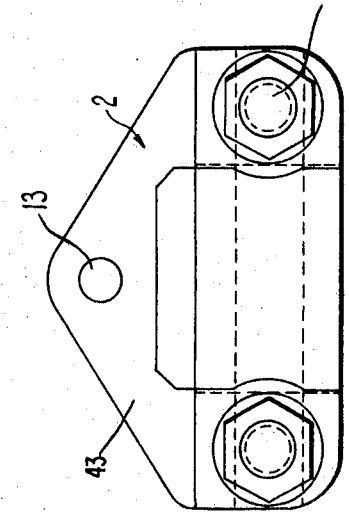
FIG. 3 is a side view in elevation of a lower jaw for holding the band of the fastening device.
Figure 7:
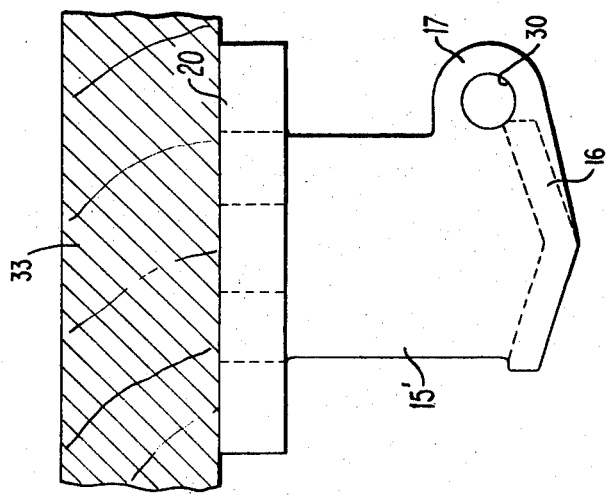
FIG. 7 is a view similar to FIG. 6, but illustrating a slightly modified form of upper support.
Figure 7A:
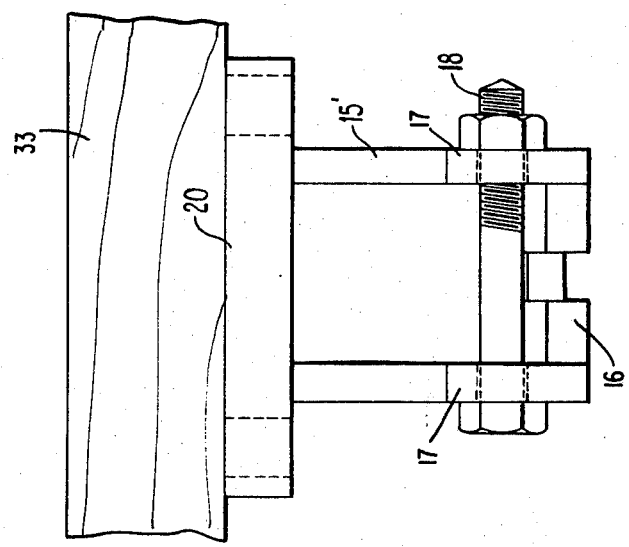
FIG. 7A is a side view in elevation of the upper support illustrated in FIG. 7, as seen from the right-hand side of FIG. 7.
Figure 8:
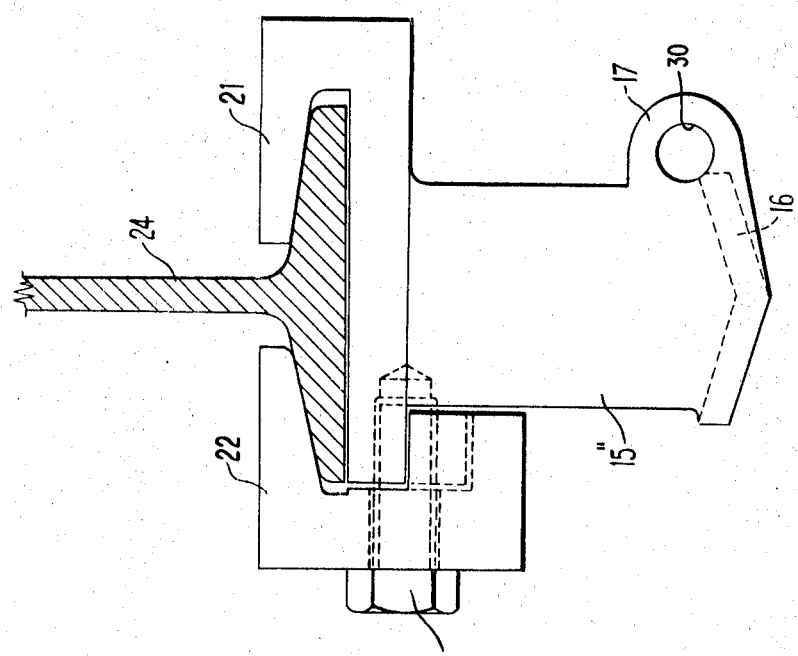
FIG. 8 is also a view similar to FIG. 6, but illustrating another modified form of the upper support.
Figure 8A:
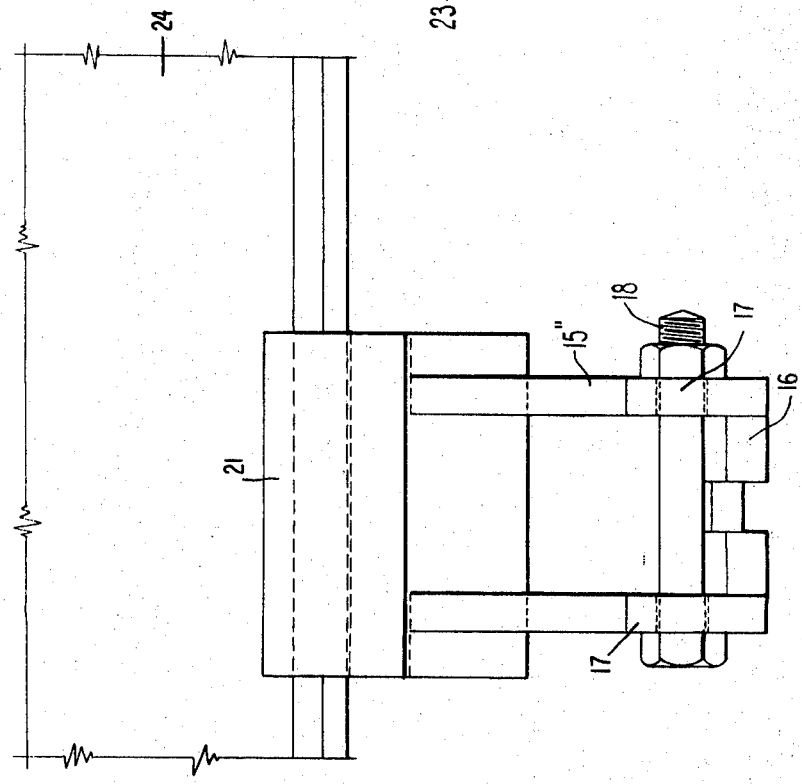
FIG. 8A is a side view in elevation of the upper support illustrated in FIG. 8, as seen from the right-hand side of FIG. 8.
Figure 9:
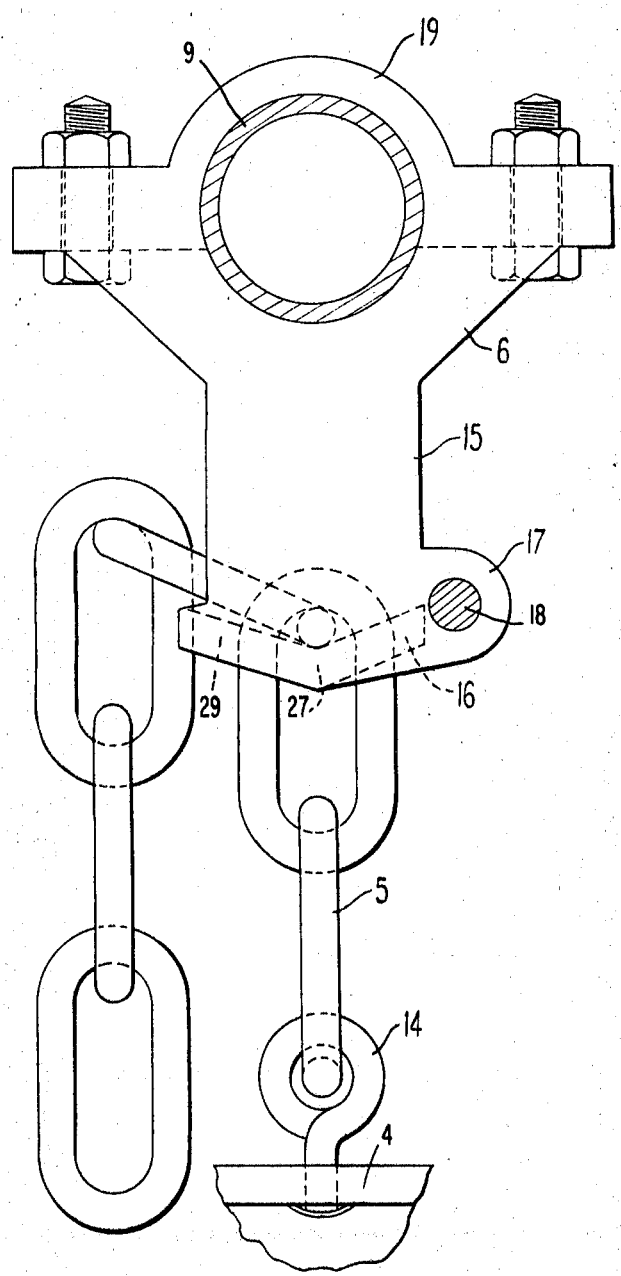
FIG. 9 is a front view in elevation of the upper support illustrated in FIG. 6, and illustrating the manner in which it is connected to the upper clamping jaw.
Figure 10:
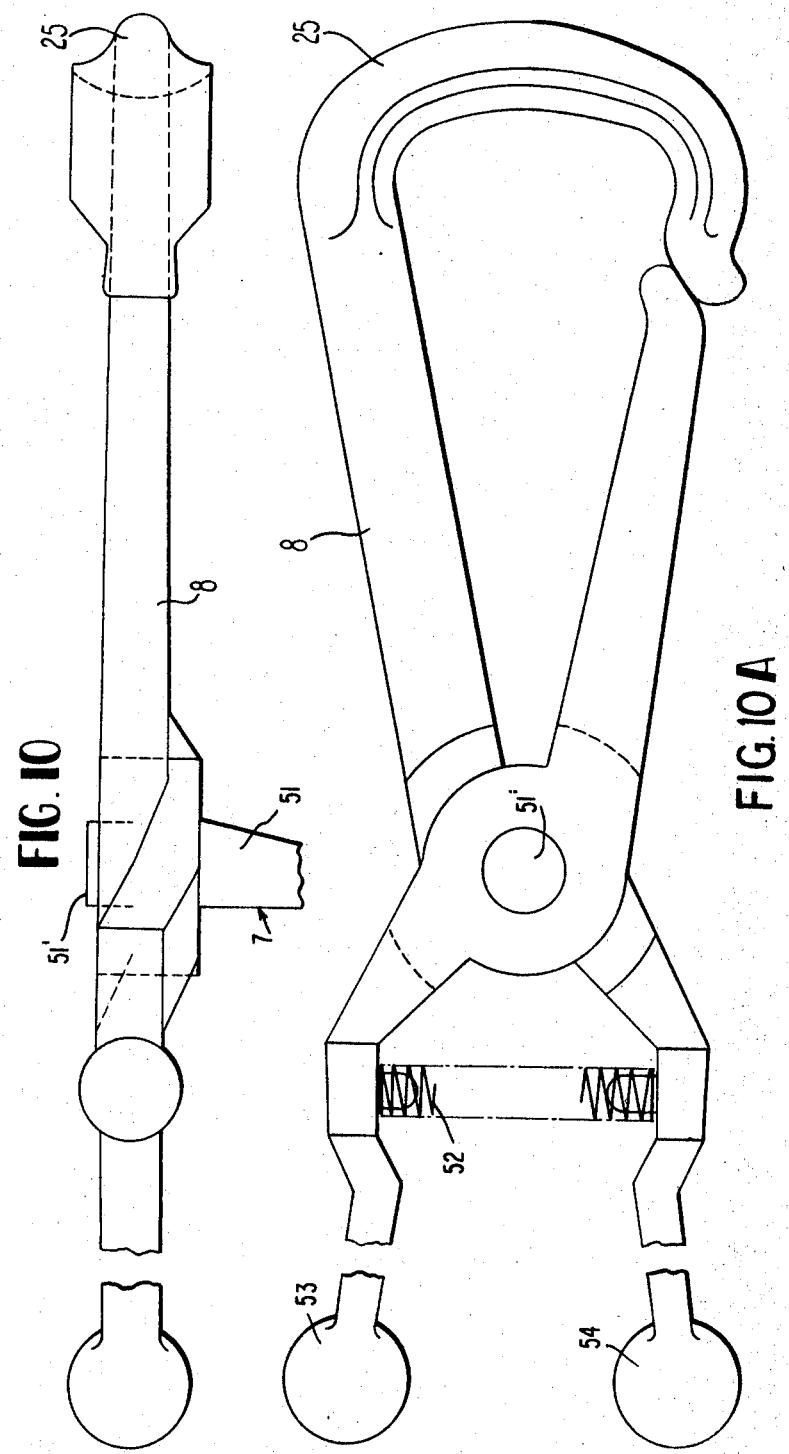
FIG. 10 is a fragmentary front view in elevation of the clip portion of the collar of the fastening device.
Figure 11:
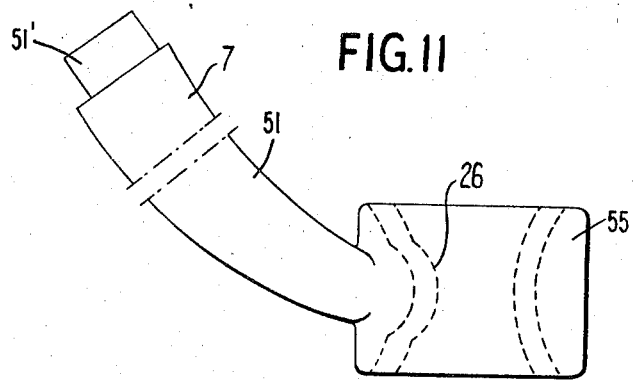
FIG. 11 is a fragmentary front view in elevation of another portion of the collar of the fastening device.
Figure 11A:
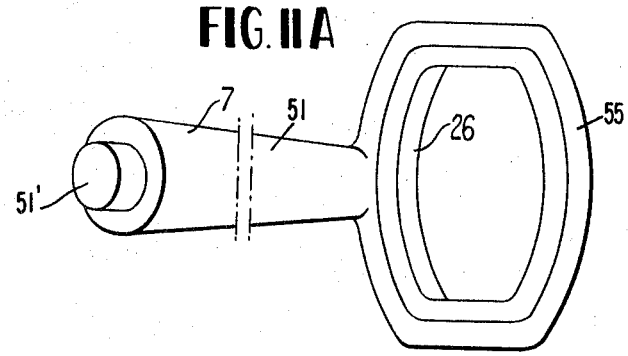
FIG. 11A is a top plan view of the collar portion illustrated in FIG. 11.
Figure 12:
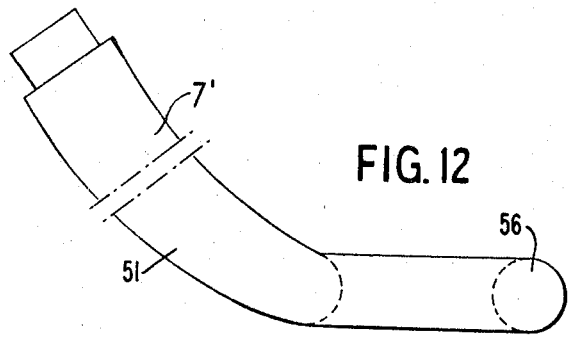
FIG. 12 is a fragmentary front view in elevation similar to FIG. 11, but illustrating a slightly modified form of the collar portion.
Figure 12A:
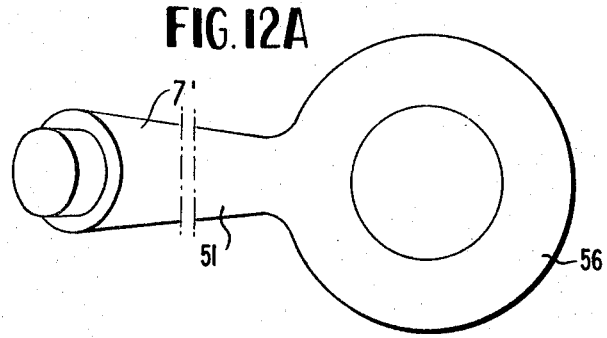
FIG. 12A is a top plan view of the collar portion illustrated in FIG. 12.

Referring to the drawings in detail, wherein like numerals indicate like elements throughout the several views, an elastic band 3 comprising a vertical tie element is fastened to the ground and upper structure of the stable by means of supports 1, 6, respectively, which comprise a part of the improvements of the fastening device. The lower end of band 3 is always fastened to the ground while the upper end can be clamped to a bar or tubular member 9 arranged at an appropriate height, an I-beam or a single wooden beam located in the stable; the characteristics of the support varying according to the clamping element and bearings used.

The upper support 6 includes a hollow part 15 having a prism configuration and therefore box-shaped of which both side surfaces are closed and front ones opened, exposing an angular shaped bottom 16 which is cut from one of its front surfaces by a cross cut or channel 27 which forms at each side a rib 28 perpendicular to the side surfaces to which they are connected. The channel 27 practically cuts the part 15 into two halves, leaving on the front surface opposite to that of the cutting a union bridge 29 through which the bottom continues and unifies. Extending from the front surface which is cut by the channel are two parallel lugs 17, having openings 30 through which is inserted a locking pin 18.

On its upper part and transversely thereof, the support has a bolted head 19. Head 19 has a semi-cylindrical groove 31 which makes with a semi-cylindrical groove 32 on part 15 to form a clamp for cylindrical support bar 9.

In the case in which the clamp 15' is carried out on a common and normal wooden beam 33, it is provided with an upper head 20 having a simple flat surface adapted to be screwed directly to the lower side of the beam.

In the case where the clamping is effected on an I-beam 24, the part 15" is provided with clamping jaws 21, 22, which have wedge-shaped surfaces in sliding engagement with opposite sides of one of the flanges of the I-beam. Floating jaw 22 carries a setscrew 23 which is received on jaw 21 fixed to part 15". Movement of setscrew 23 will slide the wedge-shaped surfaces of surfaces 21, 22 into tight engagement with the I-beam flange.

The anchoring of the band 3 on the upper support 6 is not effected in a direct manner, but by means of the addition of a piece of chain 5, which is connected to rotary hook 14 of an upper clamping jaw 4, in turn, coupled to the terminal or upper end of the aforementioned nylon band 3 or vertical tie.

One of the links of the additional piece of chain 5 is inserted through the channel 27 on the bottom of upper support 6 with the immediate link located above extending across the angular bottom 29 of the support 6, that is, against the portion of the same not cut by the channel. The chain 5 remains fastened to the support 6 without any possibility of falling by the joint action of the rear bridge 29 which acts as a stop, and the locking pin 18 between the lugs 17 closing the front surface of support 6.

The upper jaw 4 between the band 3 and the additional portion of the chain 5 has halves 35, 36 coupled to one another by means of screws 37, which clamp therebetween the upper end of the band or tie 3. The center portions of halves 35, 36 encircle the band 3 and are bent to adapt themselves to the particular cross-section of the band.

The lower support or ground anchor 1, through which the band or tie 3 is anchored to the ground, comprises a sort of nail adapted to be deeply inserted in the ground. On its upper part, anchor 1 includes means for anchoring the tie.

The connection of the band 3 to ground anchor 1 is not directly made, but it is made through a second jaw 2 disposed between the lower end of the band 3 and the anchor 1.

The second jaw 2, which is generally similar to the jaw 4 provided for connecting the band 3 to the upper support 6, also has two halves 40, 41 which are connected by means of screws 12 to clamp therebetween the lower terminal of the band 3. Halves 40, 41 have mid-portions conforming to the cross-section shape of the band 3. Half 41 of jaw 2 has a stem 43 mounting two transversely disposed, oppositely oriented, pegs 13. Pegs 13 and stem 42, are inserted through the front opening 44 of hollow head 10 of anchor 1. Stem 42 projects upwardly through a slot 45 in a spherically shaped top portion of hollow head 10, while pegs 13 abut this surface from its interior. A clamp 11 is then slid over the side walls of the hollow head 10 and wedges thereon. Surface 46 closes open front 44 preventing the pegs 13 and jaw 2 from escaping from anchor 1.

The vertical tie consists of a band 3 of relatively elastic nature, preferably nylon, which has a general oval-shaped cross-section (see FIGS. 4A and 4B). On one of its side flat surfaces, the one that faces collar 7 and the beast's neck, undulations 50 are provided.

The ovality of this band, particularly on the inside surface of the tie, which is the surface making rubbing contact with the animal's skin, makes this contact softer, thus avoiding damage to the beast's neck.

The undulations 50 provided on the same side are essential, since this particular shape of the band on one of its surfaces is just what prevents the collar 7 from sliding unduly along the tie and falling to the ground.

The collar 7 includes a rigid bent arm 51 connected at one end 51' to a gripper element 8, which has a clip portion 25 which can be alternatively opened and closed around the vertical tie 3. Gripper element 8 is a simple locking device with a spring 52 tending to keep the closed end handles 53, 54 from opening clip 25 to remove it from engagement with band 3. Clip 25 is around tie 3 and its front part is in frictional contact with the tie, holding collar 7 in place.

At is opposite end, arm 51 of collar 7 terminates in a ring 55 encircling band 3. Ring 55 includes an undulation or projection 26 generally complemental in shape to the undulations 50 on band 3. When upright, the internal cross-wise diameter of ring 55 is larger than the corresponding diameter of the band 3, providing the necessary clearance to make vertical sliding of collar 7 on band 3 possible so the animal's head retained by the arm 51, band 3, and gripper element 8 can be raised and lowered. But, upon release of the animal by removal of clip 25 from contact with the band 3, arm 51 of collar 7 will tilt or cant away from the band 3. In this event, projection 26 will frictionally bind in an undulation 50 on band 3, preventing the collar from falling to the ground.

In a modified form of the invention, a normal chain can be substituted for nylon band 3 to act as a vertical tie.

In this form, the chain is calibrated with a millimetric clearance as regards the interior of ring 56 through which the collar 7' articulates on the chain, which allows for sliding movement when the ring 56 is upright. When arm 51 cants when clip 25 is removed from the chain, ring 56 will frictionally bind on a chain link.

The upper anchoring of the chain is carried out in a manner similar to that effected for the band 3, except jaw 4 can be eliminated and the chain connected directly to support 6.

At its lower end, one of the chain links is inserted through slide 45 and rotated so it will abut the spherical portion of head 10 of the anchor 1. Clip portion 25 of gripper 8 should be of a smaller dimension when used with the chain tie for grasping the sides of the chain links.

What is claimed is:

1. An animal fastening device comprising a substantially vertical tie member adapted to be anchored at its terminal portions, collar means articulated on said tie member for receiving the neck of an animal, said collar means comprising an arm, said arm including an arcuate lower portion and an upwardly extending upper portion spaced laterally from said tie member to receive the neck of an animal therebetween, ring means slidably encompassing said tie member and pivotally connecting the lower portion of said arm to said tie member, means forming a collar closure releasably coupling the tie member and the upper portion of said arm to preclude the lower portion and an upwardly extending upper portion ber to open said collar, said ring means including a surface for locking engagement with said tie member upon pivotal movement of the lower portion of said arm caused by the opening of said collar closure means to prevent said arm from sliding along said tie member, said tie member being a band having a series of undulations along one surface thereof, and said surface on said ring means including an interior projection complemental in shape to said undulations for frictionally binding on one of said undulations upon pivotal movement of the lower portion of said arm.

2. An animal fastening device in accordance with claim 1 wherein said band is substantially oval-shaped in cross-section and has a pair of opposite arcuate surfaces, and said undulations are formed along one of the arcuate surfaces of said band, said undulating surface of said band facing the spaced, upwardly extending upper portion of said arm.

3. An animal fastening device in accordance with claim 2 wherein said band is elastic.

4. An animal fastening device in accordance with claim 1 wherein said tie member is a chain formed from individually connected links, and said surface of said ring means including the interior circumference thereof, said surface having a diameter slightly greater than the width of any of the individual links of said chain whereby sliding clearance is provided with said chain when the upper arm portion of said arm is releasably coupled to said chain, but upon pivotal movement of said arm upon opening of said collar closure means said surface will bind on said chain links.

5. An animal fastening device in accordance with claim 1 wherein said collar closure means releasably coupling said tie member and the upper portion of said arm includes an elongated, substantially horizontal clip carried by the upper portion of said arm and adapted to frictionally encompass said tie member, and spring biased handle means connected to said clip for opening and closing it.

6. An animal fastening device in accordance with claim 1 including means connected to said band for anchoring said band, said means including a ground anchor having means releasably coupling one terminal portion of said band to said anchor, said means including a clamp in clamping engagement with one terminal portion of said band and releasably coupled to said anchor, and an upper support for connecting the other terminal portion of said band to a structural element, said upper support including a head adapted to be secured to a structural element and means for releasably suspending the other terminal portion of said band from said upper support, said suspension means including a hollow extension depending from said head and having an opening into the interior thereof adapted to receive a chain therethrough, means within said hollow extension for holding said chain, and a clamp coupled to said chain in clamping engagement with the other terminal portion of said band.

7. An animal fastening device in accordance with claim 4 including means connected to opposite terminals of said chain tie member for anchoring said tie member, said means including a ground anchor having means for releasably coupling one terminal portion of said chain to said anchor, and an upper support for connecting the other terminal portion of said chain to a structural element, said upper support including a head adapted to be secured to a structural element, and means for releasably suspending the other terminal portion of said chain from said upper support, said suspension means including a hollow extension depending from said head and having an opening into the interior thereof and adapted to receive the chain tie member therethrough, and means within said hollow extension for holding said chain.

References Cited

UNITED STATES PATENTS

| | | | |
|---|---|---|---|
| 3,043,270 | 7/1962 | Guillaume et al. | 119—119 |
| 3,203,398 | 8/1965 | Eguizabal | 119—119 |

ALDRICH F. MEDBERY, Primary Examiner

U.S. Cl. X.R.

119—147